(12) United States Patent
Huang et al.

(10) Patent No.: US 9,118,918 B2
(45) Date of Patent: Aug. 25, 2015

(54) METHOD FOR RATE-DISTORTION OPTIMIZED TRANSFORM AND QUANTIZATION THROUGH A CLOSED-FORM OPERATION

(75) Inventors: Tsung Yau Huang, Taipei (TW); Homer H. Chen, Taipei (TW); Po-Yen Su, Taipei (TW); Chieh Kai Kao, Taipei (TW); Tao-Sheng Ou, Taipei (TW)

(73) Assignee: National Taiwan University, Taipei (TW)

( * ) Notice: Subject to any disclaimer, the term of this patent is extended or adjusted under 35 U.S.C. 154(b) by 762 days.

(21) Appl. No.: 13/413,598

(22) Filed: Mar. 6, 2012

(65) Prior Publication Data

US 2013/0235938 A1 Sep. 12, 2013

(51) Int. Cl.
| | |
|---|---|
| *H04N 19/157* | (2014.01) |
| *H04N 19/176* | (2014.01) |
| *H04N 19/147* | (2014.01) |
| *H04N 19/172* | (2014.01) |
| *H04N 19/149* | (2014.01) |
| *H04N 19/124* | (2014.01) |
| *H04N 19/61* | (2014.01) |
| *H04N 19/142* | (2014.01) |

(52) U.S. Cl.
CPC ........... *H04N 19/157* (2014.11); *H04N 19/124* (2014.11); *H04N 19/147* (2014.11); *H04N 19/149* (2014.11); *H04N 19/172* (2014.11); *H04N 19/176* (2014.11); *H04N 19/142* (2014.11); *H04N 19/61* (2014.11)

(58) Field of Classification Search
None
See application file for complete search history.

(56) References Cited

U.S. PATENT DOCUMENTS

2005/0180500 A1* 8/2005 Chiang et al. ............... 375/240

OTHER PUBLICATIONS

Karczewicz, et al. "R-D Based Quantization in H.264," Applications of Digital Image Processing XXXII, vol. 7443, 2009.*
Wang, et al. "Rate Distortion Optimized Quantization for H.264/AVC Based on Dynamic Programming," Visual Communications and Image Processing 2005, Proc. of SPIE vol. 5960.*
He et al. "A Linear Source Model and a Unified Rate Control Algorithm for DCT Video Coding," IEEE Transactions on Circuits and Systems for Video Technology, vol. 12, No. 11, Nov. 2002.*
Huang et al. "Quality Improvement of Video Codec by Rate-Distortion Optimized Quantization" IEEE Workshop on Multimedia Quality of Experience, Dana Point, CA, Dec. 2011, 6 pgs.
Yang et al. "Rate Distortion Optimization for H.264 Interframe Coding: A General Framework and Algorithms" IEEE Transactions on Image Processing, vol. 16, No. 7, Jul. 2007, pp. 1774-1784.
Yang et al. "Soft Decision Quantization for H.264 With Main Profile Compatibility" IEEE Transactions on Circuits and Systems for Video Technology, vol. 19, No. 1, Jan. 2009, pp. 122-127.

(Continued)

*Primary Examiner* — William C Vaughn, Jr.
*Assistant Examiner* — Michael J Hess
(74) *Attorney, Agent, or Firm* — Donald E. Stout; Stout, Uxa & Buyan, LLP

(57) ABSTRACT

The present invention is directed to a rate-distortion optimized (RDO) transform and quantization system. A frame classification unit classifies an input frame as either a key frame or a non-key frame. A rate model update unit generates at least one model parameter of a rate model according to a transform coefficient and a bitrate resulted from an encoded key frame. An RDO transform and quantization unit processes the input frame, thereby generating a quantized transform coefficient according to the model parameter. A frame buffer is used to store a previous frame, according to which the bitrate is estimated.

4 Claims, 4 Drawing Sheets

(56) References Cited

OTHER PUBLICATIONS

Yang et al. "Rate Distortion Optimization of H.264 with Main Profile Compatibility" IEEE International Symposium on Information Theory, Seattle, USA, Jul. 9-14, 2006, pp. 282-286.

Wang et al. "Rate Distortion Optimized Quantization for H.264/AVC Based on Dynamic Programming" Proc. of SPIE Visual Communications and Image Processing, vol. 5960, Jul. 2005, pp. 2100-2111.

Wen et al. "Trellis-Based R-D Optimal Quantization in H.263+" IEEE Transactions on Image Processing, vol. 9, No. 8, Aug. 2000, pp. 1431-1434.

Xiao et al. "An Efficient Algorithm for Joint QP and Quantization Optimization for H.264/AVC" IEEE 17th International Conference on Image Processing, Hong Kong, Sep. 26-29, 2010, pp. 1233-1236.

Karczewicz et al. "Rate Distortion Optimized Quantization" Video Coding Experts Group, ITU—Telecommunications Standardization Sector, 34th Meeting: Antalya Turkey, VCEG-AH21, Jan. 12-13, 2008, 3 pgs.

Karczewicz et al. "R-D Based Quantization in H.264" Proc. of SPIE, vol. 7443, 744314, 2009, 8 pgs.

Jiang et al. "Rate-Distortion Based Quantisation Level Adjustment for H.264" Electronics Letters, vol. 41, No. 16, Aug. 4, 2005, pp. 29-30.

Wen et al. "Fast Rate Distortion Optimized Quantization for H.264/AVC" Data Compression Conference, Mar. 24-26, 2010, p. 557.

\* cited by examiner

METHOD FOR RATE-DISTORTION OPTIMIZED TRANSFORM AND QUANTIZATION THROUGH A CLOSED-FORM OPERATION

BACKGROUND OF THE INVENTION

1. Field of the Invention

The present invention generally relates to video coding, and more particularly to a system of rate-distortion optimized (RDO) transform and quantization.

2. Description of Related Art

The high performance of H.264 video coding is attributed to, among others, the adoption of rate-distortion optimization (RDO) framework, which attains good balance between distortion and bitrate for mode decision and rate control.

Moreover, some methods have recently adopted the rate distortion optimization framework for another important component of a video encoder—quantization. However, a common drawback of these methods is the high computational overhead due to, for example, an exhaustive search and redundant entropy coding process to determine the quantized transform coefficients with lowest rate-distortion cost, as discussed in "Rate distortion optimization for H.264 interframe coding: a general framework and algorithms," by E.-H. Yang and X. Yu, IEEE Trans. Image Process., vol. 16, no. 7, July 2007, and "Rate distortion optimized quantization," by M. Karczewicz, Y. Ye and I. Chong, VCEG-AH21, January 2008.

For the reason that the transform and quantization of H.264 only considers the distortion between original and reconstructed video as the cost of compression, and conventional methods perform distortion optimization with high computational overhead, a need has thus arisen to develop a novel scheme with high efficiency and low computational complexity for a video coding process.

SUMMARY OF THE INVENTION

In view of the foregoing, it is an object of the embodiment of the present invention to provide a system of rate-distortion optimized (RDO) transform and quantization that allow the bitrate of quantized transform coefficient to be efficiently estimated. Another object of the embodiment of the present invention is to provide a closed-form solution for the rate-distortion optimized (RDO) quantized transform coefficient, making the optimization process computationally tractable.

According to one embodiment, the rate-distortion optimized (RDO) transform and quantization system includes a frame classification unit, a rate model update unit, and an RDO transform and quantization unit. The frame classification unit is configured to classify an input frame as either a key frame or a non-key frame. The rate model update unit is configured to generate at least one model parameter of a rate model according to a transform coefficient and a bitrate resulted from an encoded key frame. The RDO transform and quantization unit is configured to process the input frame, thereby generating a quantized transform coefficient according to the model parameter. A frame buffer is configured to store a previous frame, according to which the bitrate is estimated.

DETAILED DESCRIPTION OF THE INVENTION

Figure 1:
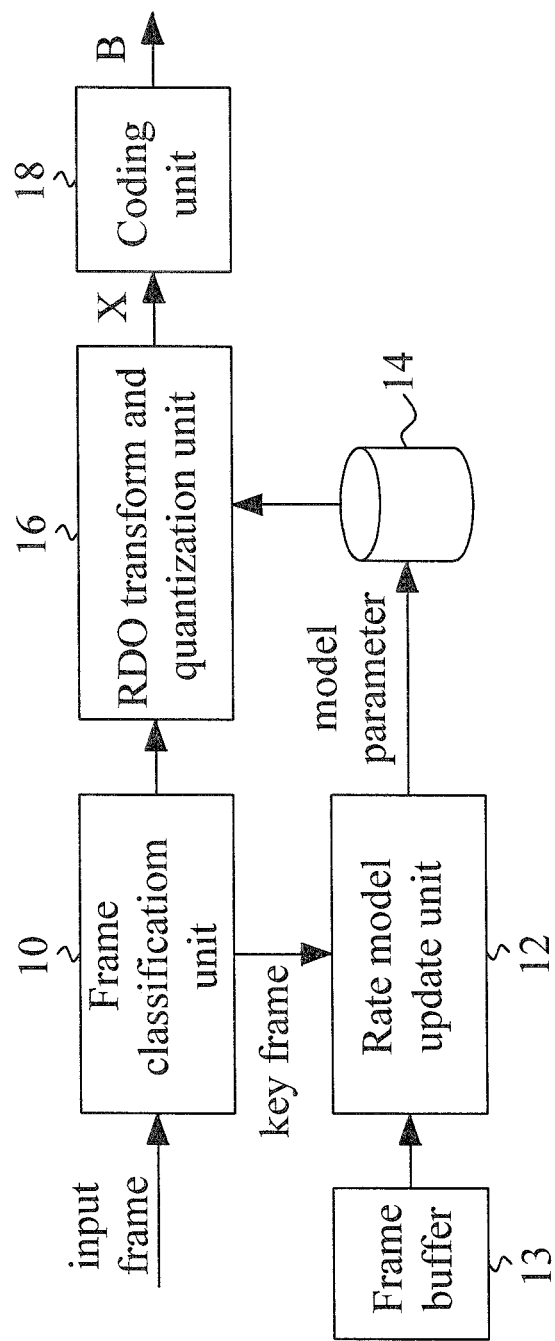
FIG. 1 shows a block diagram of a rate-distortion optimized (RDO) transform and quantization system according to one embodiment of the present invention.

FIG. 1 shows a block diagram of a rate-distortion optimized (RDO) transform and quantization system according to one embodiment of the present invention. The embodiment illustrated below may be adapted to, but not limited to, H.264 coding standard. The shown blocks of the system may be performed by a processor (e.g., a digital image processor), software or their combination.

In the embodiment, an input frame is first classified as a key frame or a non-key frame by a frame classification unit 10. Generally speaking, the first frame of a whole video sequence may be classified as a key frame, and the first frame of a sub-sequence in the video sequence may also be classified as a key frame. The frames other than the key frame in the whole video sequence or the sub-sequence are classified as non-key frames. It is noted that the frames in a sub-sequence may have similar R-D characteristics, and different sub-sequences may have distinct R-D characteristics, due to, for example, high motion or scene change.

The classified key frame is encoded by conventional transform (e.g., discrete cosine transform (DCT)) and quantization. In the specification, the term "conventional transform and quantization" means that the transform and quantization considers only distortion rather than both the distortion and bitrate. The resulting bitrate and transform coefficients are used, by a rate model update unit 12, to obtain model parameter(s) of a rate model. The model parameter(s) may be stored in a memory 14. Based on the obtained model parameter(s), the key frame is subjected to transform and quantization by a RDO transform and quantization (RDOTQ) unit 16, resulting in quantized transform coefficient X. Finally, the quantized transform coefficient X is subjected to coding (e.g., entropy coding) by a coding unit 18. For a non-key frame, it is subjected to transform and quantization by the RDO transform and quantization unit 16 directly using the existing (or updated) model parameter(s) provided by the memory 14.

With respect to the rate model update, a rate model called ρ-model is adopted with modification in the embodiment to estimate the bitrate according to a previous frame stored in a frame buffer 13, in order to minimize the rate-distortion. Details of ρ-model may be referred to "A linear source model and a unified rate control algorithm for DCT video coding," entitled to Zhihai He et al., IEEE Trans. Circuits Syst. Video Technol., vol. 12, no. 11, November 2002, the disclosure of which is incorporated herein by reference.

In the embodiment, the bitrate B may be approximated by a linear model around a given quantization parameter (QP):

$$B(X) = \alpha \cdot \|X\|_1 + \beta \quad (1)$$

where $\alpha$ and $\beta$ are model parameters, $\|X\|_1$ is one norm of the quantized transform coefficient X, which is defined as the sum of the absolute values of all elements in X.

Figure 2:
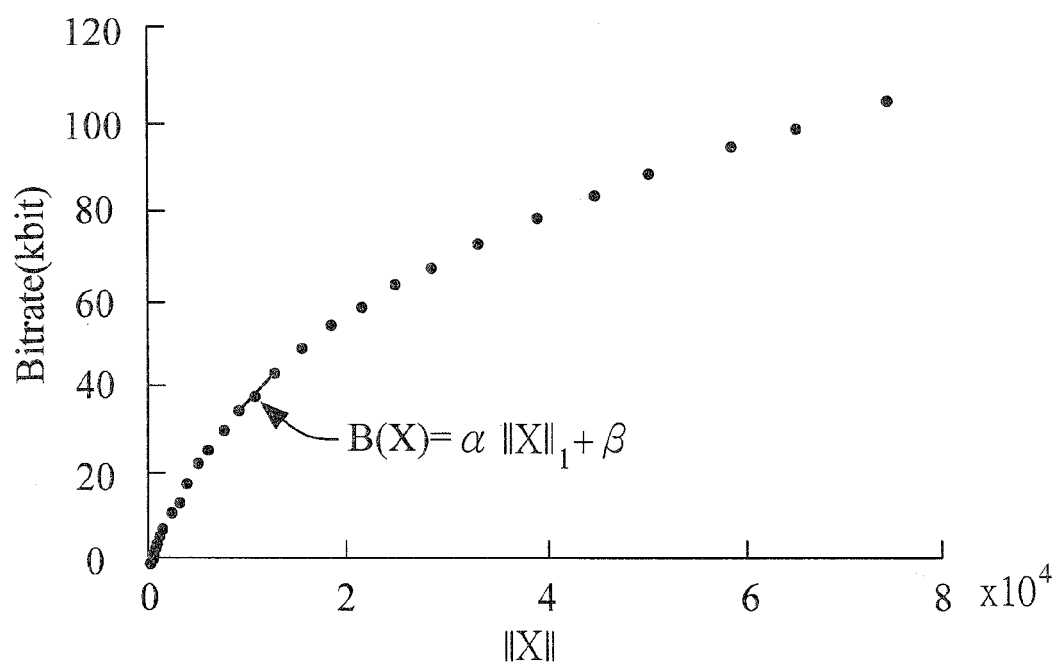
FIG. 2 shows an exemplary curve illustrative of relationship between bitrate and quantized transform coefficient.

FIG. 2 shows an exemplary curve illustrative of relationship between bitrate B and the one norm of the quantized transform coefficient X. The parameter $\alpha$ is the slope of the linear model at the given QP. To obtain $\alpha$ at a given QP, the frame is encoded twice using QP±Δ respectively as the quantization parameter values, where Δ is a small value, therefore resulting in two points in the curve of FIG. 2. The slope α may then be obtained by fitting the two points. It is noted that another model parameter β does not affect the process in minimizing the rate-distortion.

Figure 3:
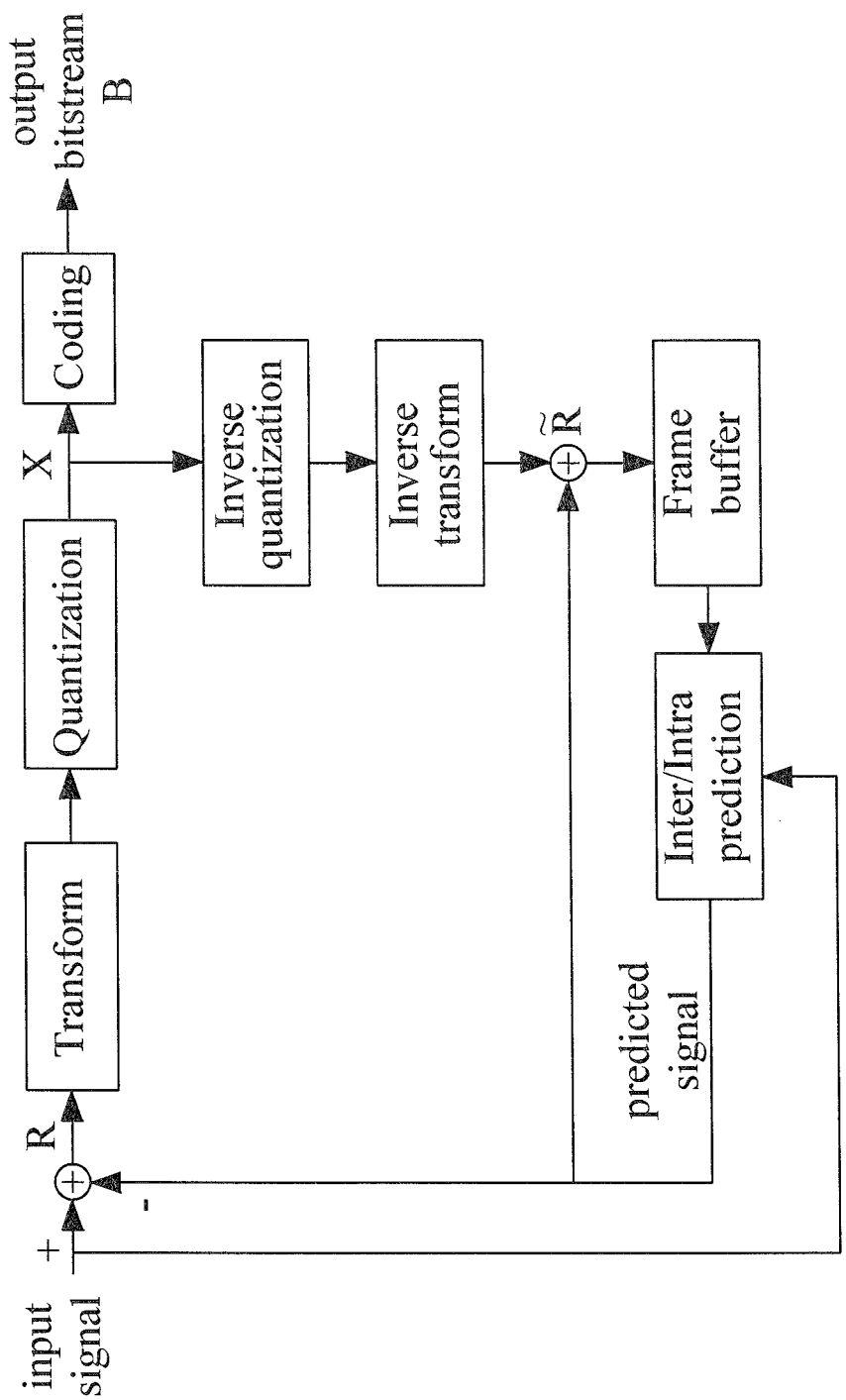
FIG. 3 illustrates the relationship among an input signal, a residual signal, a quantized transform coefficient, a reconstructed residual signal, a predicted signal and a bitrate.

In the embodiment, both the rate and distortion are to be minimized, and may be formulated as:

$$X = \operatorname*{argmin}_{X}(D(R, \tilde{R}) + \lambda B) \quad (2)$$

where B is the bitrate obtained by performing coding (e.g., entropy coding) on the quantized transform coefficient X, λ is the Lagrange multiplier defined by the cost function J=D+λB, R is a residual signal obtained by subtracting an (intra/inter) predicted signal from an input signal (e.g., an input basic unit), and $\tilde{R}$ is a reconstructed residual signal obtained by inversely quantizing and inversely transforming X. The relationship among the input signal, R, X, $\tilde{R}$, the predicted signal and B is shown in FIG. 3.

In the embodiment, the sum of squared error (SSE) is used to measure the distortion and the rate model described by (1) may be rewritten as $$X = \operatorname*{argmin}_{X}(D(\|\tilde{R} - R\|_2)^2 + \lambda \cdot \alpha \cdot \|X\|_1) \quad (3)$$

or $$X = \operatorname*{argmin}_{X}(D(\|AQX - R\|_2)^2 + \lambda \cdot \alpha \cdot \|X\|_1). \quad (4)$$

where Q is an inverse quantization matrix, and A is an inverse transform matrix, wherein $\| \|_2$ denotes two norm, which is defined as a sum of squared values of all elements therein.

The minimization expressed in (4) is known as least absolute shrinkage and selection operator (LASSO), which has the effect of shrinking the coefficients toward zero. According to one aspect of the embodiment, a closed-form solution may be derived from (4) as $$x_i = \begin{cases} 0, & |t_i| - \frac{\lambda \cdot \alpha}{2(\|(AQ)_i\|_2)^2} \le 0 \\ \operatorname{round}\left(t_i - \operatorname{sign}(t_i) \cdot \frac{\lambda \cdot \alpha}{2(\|(AQ)_i\|_2)^2}\right), & \text{otherwise} \end{cases} \quad (5)$$

where $x_i$ is an element of X, $t_i$ is an element of a quantized transform matrix T defined by T=$Q^{-1}A^{-1}$R, wherein $Q^{-1}$ is a quantization matrix, $A^{-1}$ is a transform matrix, and $$\operatorname{sign}(t_i) \cdot \frac{\lambda \cdot \alpha}{2(\|(AQ)_i\|_2)^2}$$

is an adjustment term.

Figure 4:
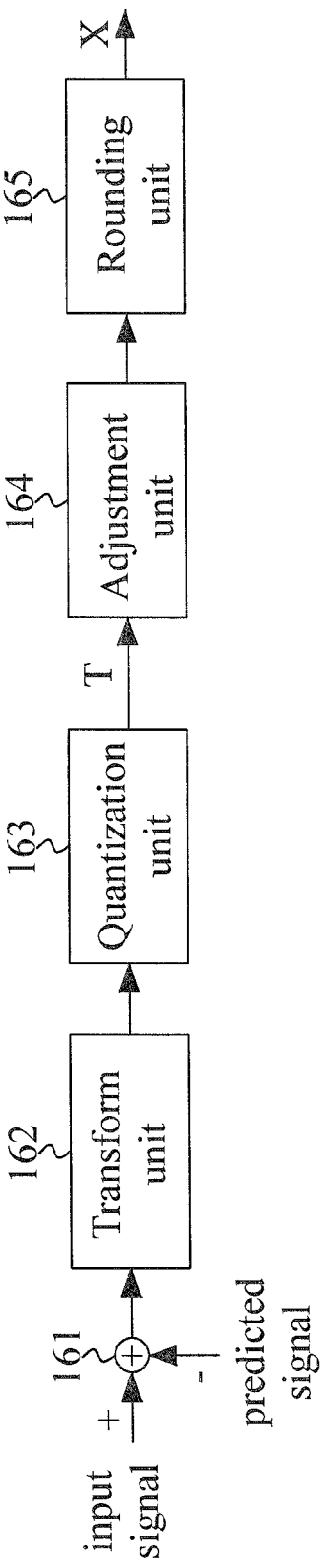
FIG. 4 shows a detailed block diagram of the RDO transform and quantization (RDOTQ) unit in FIG. 1.

With respect to (5), it is shown in FIG. 4 the detailed block diagram of the RDO transform and quantization (RDOTQ) unit 16 (FIG. 1). Specifically, the residual signal R is obtained by subtracting the (intra/inter) predicted signal from an input signal of the input (key/non-key) frame via a subtractor 161. The residual signal R is processed by a transform unit 162, and then a quantization unit 163, resulting in the quantized transform signal T. The quantized transform signal T is then adjusted with the adjustment term by an adjustment unit 164, therefore resulting in an adjusted signal. Finally, the adjusted T is rounded by a rounding unit 165, such that the rate-distortion optimized (RDO) quantized transform coefficient X may be constrained to an integer.

According to the embodiment discussed above, the coding performance of the entire coding system can be substantially improved over the conventional scheme that considers only distortion, or consider none of the distortion and bitrate. By using the rate model, the bitrate can be estimated, and a closed-form solution (e.g., (5)) is derived for the RDO quantized transform coefficient X. This considerably reduces the amount of computations required to make the rate-distortion optimization process computationally tractable, in contrast to the conventional method that performs iterative computations, which incurs high computational overhead.

Although specific embodiments have been illustrated and described, it will be appreciated by those skilled in the art that various modifications may be made without departing from the scope of the present invention, which is intended to be limited solely by the appended claims.

What is claimed is:

1. A rate-distortion optimized (RDO) transform and quantization method, comprising a processor that performs the following steps:
   a frame classification step that classifies an input frame as either a key frame or a non-key frame;
   a rate model update step that generates at least one model parameter of a rate model according to a transform coefficient and a bitrate resulted from an encoded key frame;
   an RDO transform and quantization step that processes the input frame, thereby generating a quantized transform coefficient according to the model parameter; and
   storing a previous frame in a frame buffer, and estimating the bitrate according to the previous frame;
   wherein the bitrate B is estimated by a linear model around a given quantization parameter (QP):

$$B(X)=\alpha \cdot \|X\|_1 + \beta$$

where α and β are the model parameters, $\|X\|_1$ is one norm of the quantized transform coefficient X, which is defined as a sum of absolute values of all elements in X; and
   wherein the RDO transform and quantization step is performed through a closed-form operation as $$x_i = \begin{cases} 0, & |t_i| - \frac{\lambda \cdot \alpha}{2(\|(AQ)_i\|_2)^2} \le 0 \\ \operatorname{round}\left(t_i - \operatorname{sign}(t_i) \cdot \frac{\lambda \cdot \alpha}{2(\|(AQ)_i\|_2)^2}\right), & \text{otherwise} \end{cases}$$

where $x_i$ is an element of X, $t_i$ is an element of a quantized transform matrix T defined by T=$Q^{-1}A^{-1}$R, wherein $Q^{-1}$ is a quantization matrix, $A^{-1}$ is a transform matrix, R is a residual signal obtained by subtracting a predicted signal from an input signal of the input frame, $$\operatorname{sign}(t_i) \cdot \frac{\lambda \cdot \alpha}{2(\|(AQ)_i\|_2)^2}$$

is an adjustment term, and λ is a Lagrange multiplier defined by a cost function J=D+λB, wherein D is distortion.

2. The method of claim 1, wherein the key frame is encoded twice using QP±Δ respectively as the quantization parameters, thereby resulting in two points in a curve representing relationship between the bitrate B and the quantized transform coefficient X, wherein the model parameter α is obtained by fitting the two points.

3. The method of claim 1, further comprising:
storing said at least one model parameter in a memory; and
a coding step that encodes the quantized transform coefficient, thereby generating the bitrate;
wherein the coding step performs entropy coding on the quantized transform coefficient.

4. A rate-distortion optimized (RDO) transform and quantization method, comprising a processor that performs the following steps:
a frame classification step that classifies an input frame as either a key frame or a non-key frame;
a rate model update step that generates at least one model parameter of a rate model according to a transform coefficient and a bitrate resulted from an encoded key frame;
an RDO transform and quantization step that processes the input frame, thereby generating a quantized transform coefficient according to the model parameter; and
storing a previous frame in a frame buffer, and estimating the bitrate according to the previous frame;
wherein the RDO transform and quantization step comprises:
generating a residual signal by subtracting a predicted signal from an input signal of the input frame;
a transform step that transforms the residual signal;
a quantization step that quantizes the transformed residual signal, thereby resulting in a quantized transform signal;
an adjustment step that adjusts the quantized transform signal with an adjustment term, thereby resulting in an adjusted signal; and
rounding the adjusted signal such that the RDO quantized transform coefficient is constrained to an integer;
wherein the adjustment term is obtained by minimizing rate-distortion according to $$X = \underset{X}{\mathrm{argmin}}(D(R, \tilde{R}) + \lambda B)$$

where B is the bitrate obtained by performing coding on the quantized transform coefficient X, λ is a Lagrange multiplier defined by a cost function J=D+λB, D is distortion, R is a residual signal obtained by subtracting a predicted signal from an input signal of the input frame, and $\tilde{R}$ is a reconstructed residual signal obtained by inversely quantizing and inversely transforming X;
wherein the RDO transform and quantization is performed through a closed-form operation as $$x_i = \begin{cases} 0, & |t_i| - \frac{\lambda \cdot \alpha}{2(\|(AQ)_i\|_2)^2} \leq 0 \\ \mathrm{round}\left(t_i - \mathrm{sign}(t_i) \cdot \frac{\lambda \cdot \alpha}{2(\|(AQ)_i\|_2)^2}\right), & \text{otherwise} \end{cases}$$

where $x_i$ is an element of X, $t_i$ is an element of the quantized transform matrix T defined by $T=Q^{-1}A^{-1}R$, wherein $Q^{-1}$ is a quantization matrix, A-1 is a transform matrix, $$\mathrm{sign}(t_i) \cdot \frac{\lambda \cdot \alpha}{2(\|(AQ)_i\|_2)^2}$$

is the adjustment term, and α is the model parameter of the rate model.

* * * * *